(12) United States Patent
Johansson et al.

(10) Patent No.: US 7,586,433 B1
(45) Date of Patent: Sep. 8, 2009

(54) DUAL PORT MEMORY TRIGGER SYSTEM FOR A GROUND PENETRATING RADAR

(75) Inventors: Bernth A. T. Johansson, Malå (SE); Tommy Leijon, Nyköping (SE)

(73) Assignee: Mala Geoscience AB, Mala (SE)

( * ) Notice: Subject to any disclaimer, the term of this patent is extended or adjusted under 35 U.S.C. 154(b) by 217 days.

(21) Appl. No.: 11/691,161

(22) Filed: Mar. 26, 2007

(51) Int. Cl.
*G01S 13/08* (2006.01)

(52) U.S. Cl. .............................. 342/22; 342/82; 342/85

(58) Field of Classification Search .................... 342/22, 342/73, 82–89, 200–204
See application file for complete search history.

(56) References Cited

U.S. PATENT DOCUMENTS

| | | | |
|---|---|---|---|
| 3,134,976 A * | 5/1964 | Williamson | 342/135 |
| 3,172,042 A * | 3/1965 | Dawirs | 377/110 |
| 3,517,172 A * | 6/1970 | Dillard | 341/122 |
| 3,737,899 A * | 6/1973 | Georgopoulos | 342/157 |
| 4,069,481 A * | 1/1978 | Easy et al. | 342/185 |
| 4,250,454 A * | 2/1981 | Sakamoto | 327/241 |
| 4,517,567 A * | 5/1985 | Lee et al. | 342/202 |
| 5,248,975 A | 9/1993 | Schutz | |
| 5,278,566 A * | 1/1994 | Fujikawa et al. | 342/174 |
| 6,496,137 B1 | 12/2002 | Johansson | |
| 6,617,996 B2 | 9/2003 | Johansson et al. | |
| 6,700,526 B2 | 3/2004 | Witten | |
| 6,772,091 B1 | 8/2004 | Roberts | |
| 6,867,732 B1 * | 3/2005 | Chen et al. | 342/160 |
| 6,956,422 B2 * | 10/2005 | Reilly et al. | 327/261 |
| 7,345,617 B2 * | 3/2008 | Friborg et al. | 342/22 |
| 7,479,918 B2 * | 1/2009 | Johnson et al. | 342/22 |
| 7,492,303 B1 * | 2/2009 | Levitan et al. | 342/22 |
| 2002/0196177 A1 * | 12/2002 | Johansson et al. | 342/22 |
| 2003/0043067 A1 | 3/2003 | Johansson et al. | |
| 2006/0097905 A1 * | 5/2006 | Friborg et al. | 342/22 |
| 2006/0132340 A1 * | 6/2006 | Lin | 341/120 |
| 2008/0150780 A1 * | 6/2008 | Nakamura | 341/155 |
| 2008/0310246 A1 * | 12/2008 | Joshi et al. | 365/230.06 |
| 2009/0015459 A1 * | 1/2009 | Mahler et al. | 342/22 |
| 2009/0033539 A1 * | 2/2009 | Zemany | 342/22 |
| 2009/0058710 A1 * | 3/2009 | Levitan et al. | 342/22 |

FOREIGN PATENT DOCUMENTS

WO    WO 2004055546 A1 *   7/2004

* cited by examiner

*Primary Examiner*—John B Sotomayor
(74) *Attorney, Agent, or Firm*—Faegre & Benson LLP (57) ABSTRACT

Systems and methods for generating trigger signals in a ground penetrating radar. In one embodiment, sequence data is generated based on a desired triggering sequence for an array of antennas. The sequence may be generated based on position data from position devices and operational modes. According to one embodiment, as the sequence data is generated it is transferred to, and stored on, a dual port memory device through a first side of the dual port memory device. The sequence data can then be accessed independently through a second side of the dual port memory device. This data may be used by a logical network to produce antenna trigger signals as a logical combination of timing input signals and the sequence data.

20 Claims, 11 Drawing Sheets

DUAL PORT MEMORY TRIGGER SYSTEM FOR A GROUND PENETRATING RADAR

TECHNICAL FIELD

The present invention generally relates to systems and methods for ground penetrating radar (GPR). More specifically, the present invention relates to trigger systems for GPR arrays.

BACKGROUND

GPR systems may be used for the identification of buried objects. GPR systems are generally described in U.S. Pat. No. 6,496,137 of Johansson which is entitled "Ground Penetrating Radar Array and Timing Circuit." Unlike upward-looking radar used for air traffic control and meteorology, an antenna array in a GPR is directed toward the ground and can be used for geophysical applications such as mapping subsurface strata, locating toxic waste sites for remediation, and detecting of unexploded subsurface ordinance. The Johansson U.S. Pat. No. 6,496,137 is incorporated herein by reference.

The systems and methods described in the Johansson patent include a first delay circuit for receiving a transmit timing input signal and for generating a number of intermediate transmit timing signals delayed with respect to each other by a delay time. A transmit output switch circuit selects either the transmit timing input signal or a corresponding one of the intermediate transmit timing signals as a corresponding output transmit timing signal. Similarly, the Johansson patent discloses a second delay circuit for receiving the receive timing input signal and for generating a number of intermediate receive timing signals delayed with respect to each other by a delay time. A shift-delay circuit is coupled to the second delay circuit and the receive timing input signal to add the delay time to the intermediate receive timing signals. A receive output switch circuit selects either the receive timing input signal or a corresponding one of the intermediate receive timing signals as a corresponding output receive timing signal.

There is, however, a need for faster, highly accurate timing systems capable of timing multiple transmit and receive antennas to accurately image the subsurface. A timing system of this type that can be efficiently implemented would be especially desirable.

SUMMARY

The present invention is a fast and accurate trigger system in ground penetrating radar (GPR). A system and method for use in accordance with one embodiment of the invention includes a memory and a logical network. The memory stores and outputs multiple-bit binary sequence data representative of a desired triggering sequence for the array of antennas. The logical network receives a timing input signal and the sequence data from the memory, and produces a plurality of trigger signals as a logical function of the timing input signal and the sequence data.

In one embodiment, the memory can include a dual port memory comprising a first data port for receiving the multiple-bit sequence data and a second data port for outputting the sequence data to the logical network. The dual port memory also can include a first address port for receiving addresses and storing the multiple-bit sequence data and a second address port for receiving a counter signal and causing the sequence data to be outputted at the second data port. A counter can be used to generate a counting signal to index into the memory locations. For example, in one embodiment, the output of the counter is coupled to the second address port of the dual port memory.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Figure 1:
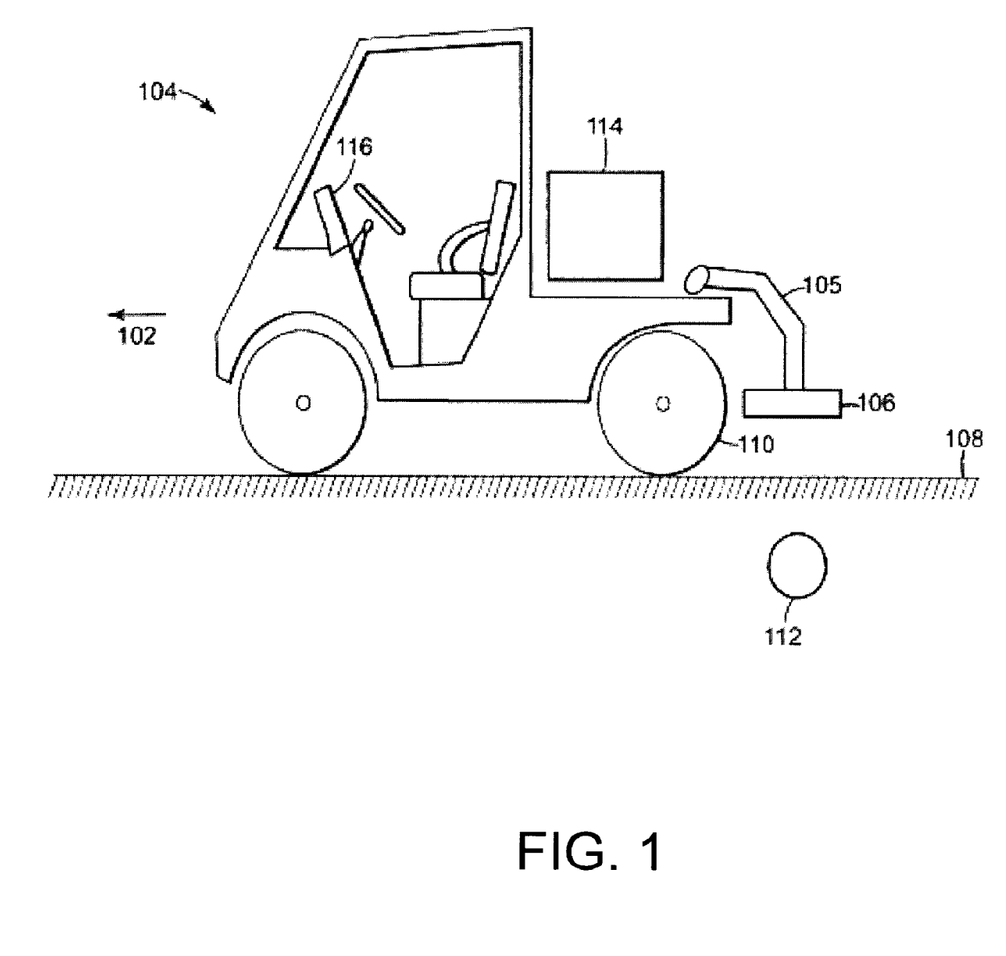
FIG. 1 illustrates an exemplary mobile vehicle with a GPR system that can include a trigger system in accordance with the present invention.

FIG. 1 is a diagram of a mobile vehicle 104 with a GPR system including a trigger system in accordance with one embodiment of the present invention. A radar array 106 attaches to an arm 105, which attaches to the back a vehicle 104, as shown in FIG. 1. Radar array 106 includes a plurality of transmit antennas and a plurality of receive antennas. Vehicle 104 moves in directions such as shown by arrow 102. Radar array 106 transmits impulses into ground 108. The impulses may reflect off of a subterranean pipe 112 and radar array 106 may receive reflected waveforms. Module 114 on the back of vehicle 104 includes electronics that control radar array 106 and process signals received by array 106. Module 114 can also display images on display 116 for the operator.

Figure 2:
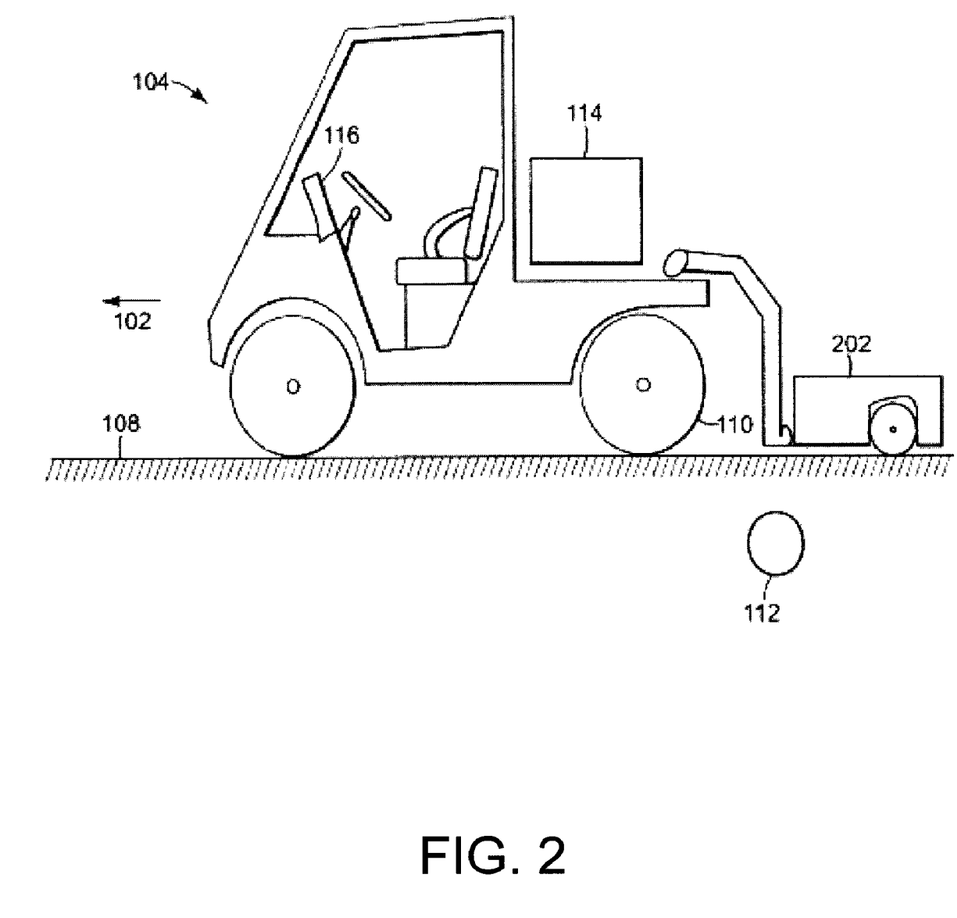
FIG. 2 illustrates an exemplary mobile vehicle with a trailer and GPR system that can include a trigger system in accordance with the present invention.

FIG. 2 is a diagram of mobile vehicle 104 with a trailer 202 having a GPR system that can include a trigger system in accordance with the present invention. In the embodiment shown in FIG. 2, radar array 106 (not shown in FIG. 2) is within trailer 202, which is attached to vehicle 104. Trailer 202 can move in the direction of arrow 102 with vehicle 104.

Figure 3:
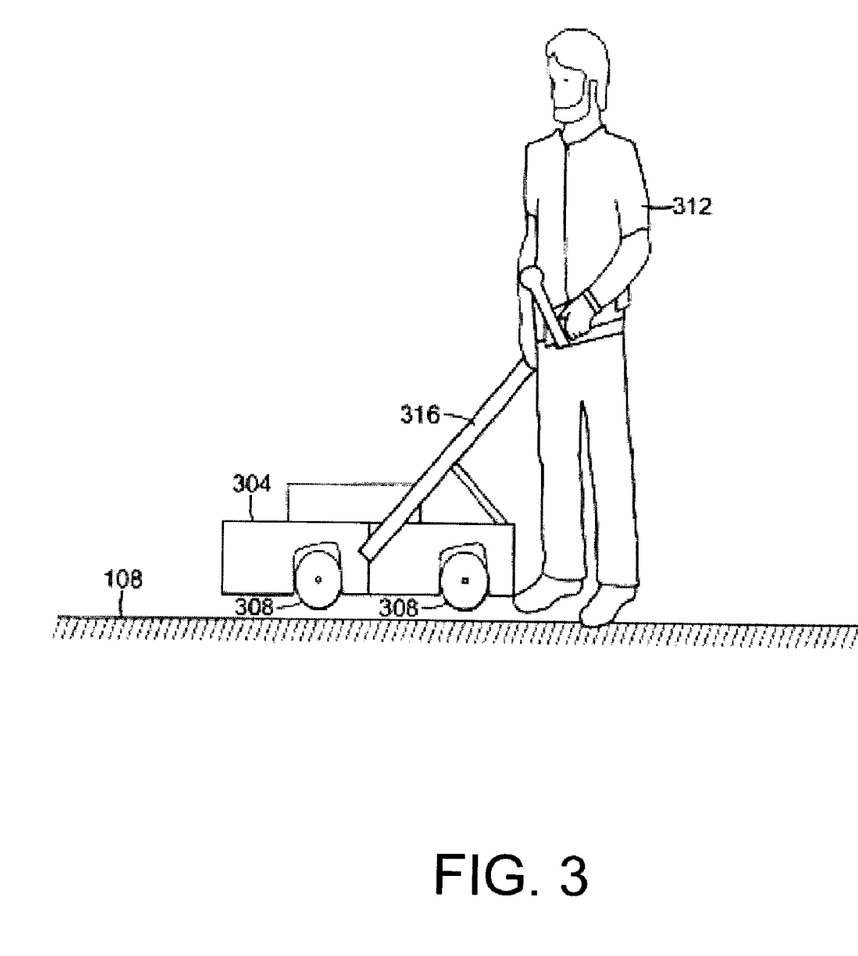
FIG. 3 illustrates an exemplary portable housing for a GPR system that can include a trigger system in accordance with the present invention.

FIG. 3 is a diagram of a portable housing 304 with a GPR system that can include a trigger system in accordance with the present invention. In the embodiment shown in FIG. 3, radar array 106 (not shown in FIG. 3) is within portable housing 304. A user 312 may guide portable housing 304 over ground 108 using a handle 316. Portable housing 304 can have wheels 308. It is possible, however, that portable housing 304 is sufficiently light to omit wheels 308.

Figure 4:
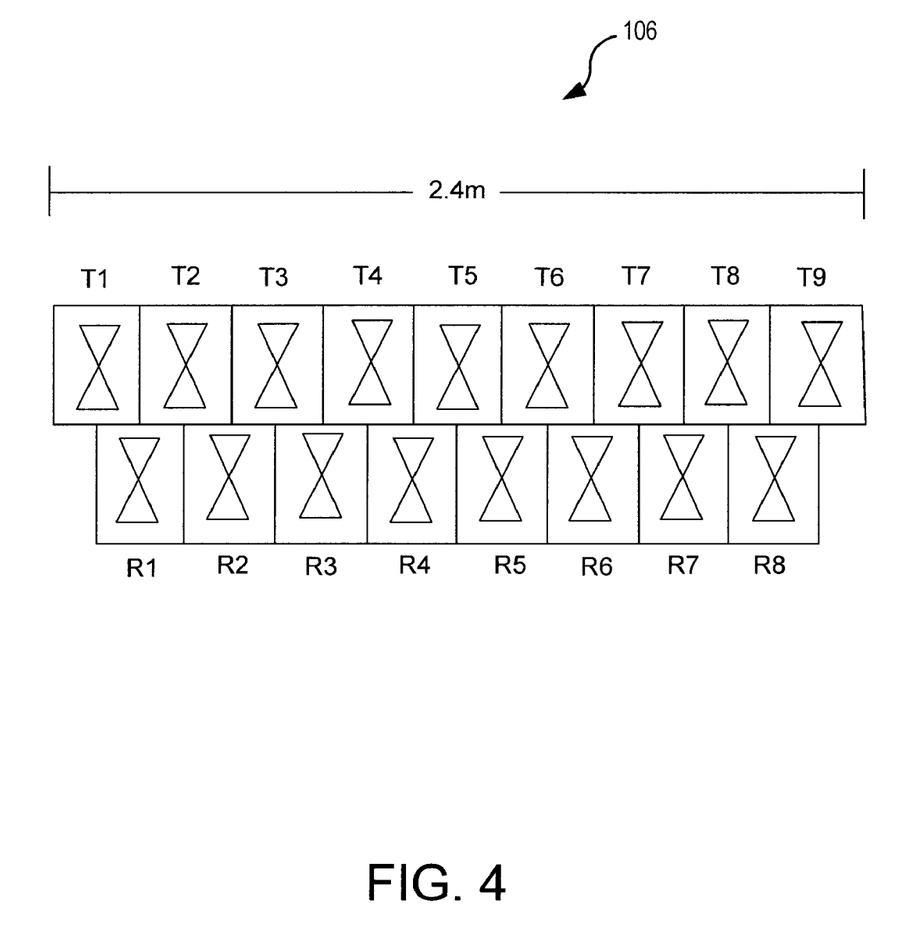
FIG. 4 illustrates an exemplary antenna array which may be used with the GPR systems shown in FIGS. 1-3.

FIG. 4 illustrates an exemplary antenna array 106 that can be used with the GPR systems shown in FIGS. 1-3. The antenna array 106 shown in FIG. 4 includes nine transmit antennas T1-T9 and eight receive antennas R1-R8. Transmit antennas T1-T9 may be linearly arranged. Receive antennas R1-R8 may also be linearly arranged and parallel to the transmit antennas. In either embodiment, receive antennas R1-R8 and transmit antennas T1-T9 may be offset from each other in the linear direction one half the width of the antennas. Those skilled in the art will appreciate that the number of receiving and transmit antennas may vary depending on a variety of factors. In addition, the arrangement of the antenna array in some embodiments, need not be linear.

The illustrated embodiment of antenna array 106 has a length that is approximately 2.4 meters. While other embodiments can have different lengths, 2.4 meters as illustrated in FIG. 4 allows array 106 to easily fit on the back of vehicle 104. The length of array 106 and the motion of vehicle 104 allow a large area of ground to be covered by the GPR system.

In one embodiment of the invention, one transmitting antenna T1-T9 may transmit at a given time and one or more receive antennas R1-R8 may receive at a given time. In other embodiments, multiple transmitting antenna may be triggered to transmit at a given time.

Still other antenna pairing schemes may be used to transmit and receive signals in other embodiments. For example, an antenna pairing scheme for "monostatic" radar measurement may be used. The triggering signals may result in a progression of pairings of transmit and receive antenna. In another embodiment, an antenna pairing for "bistatic" or "multistatic" measurement may be utilized.

Figure 5:
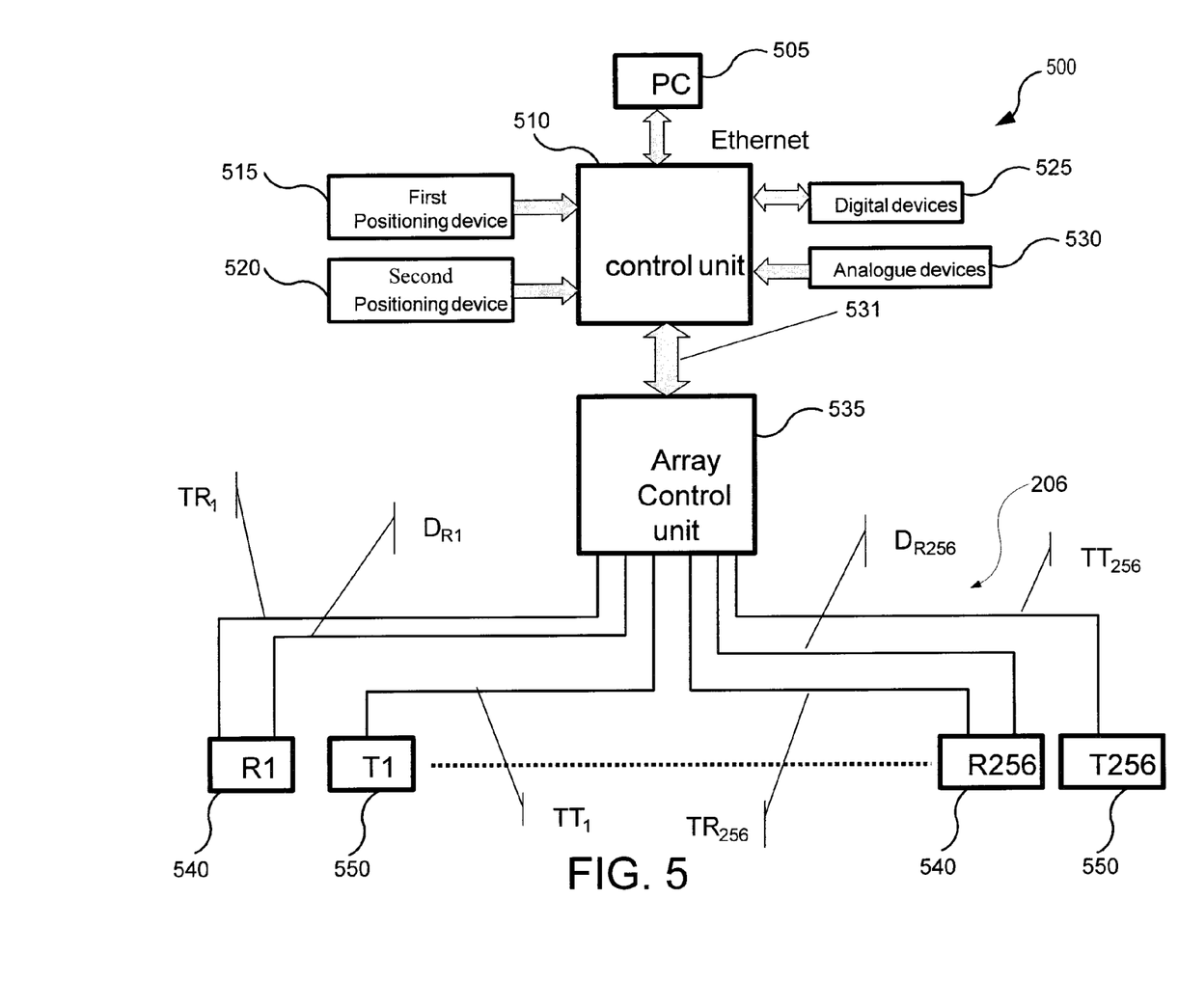
FIG. 5 is a block diagram of a GPR system in accordance with one embodiment of the present invention.

FIG. 5 is a block diagram of a GPR system 500 in accordance with one embodiment of the present invention. In the embodiment illustrated, GPR system 500 includes a personal computer (PC) 505 to display data and store radar data. For example, in one embodiment, PC 505 runs one or more applications which have graphical user interface (GUI) screens allowing a user to interact with the computer. Using these screens, the user may select one or more operational modes for the GPR system such as desired search patterns. In some embodiments, PC 505 is capable of processing and presenting data received from the GPR in a real-time fashion. PC 505, in one embodiment, is capable of retrieving and overlaying known data about the area being searched by the GPR with data being currently gathered by the GPR system.

PC 505 is communicably coupled to a control unit 510. In some embodiments, computer 505 sends and receives signals, including commands, to and from control unit 510 and performs the digital signal processing on received signals and displays images on display 116. Control unit 510 may be used for single channel or multi-channel use and may have one or more inputs for positioning devices such as 515 and 520, digital input devices 525, analog input devices 530, and an interface to allow communication to an array control unit 535.

Positioning devices 515 and 520 are used to determine a direction of movement of the GPR system. For example, first positioning device 515 may attach to a wheel 110 of vehicle 104, similar to an odometer in an automobile. This information may be transmitted to control unit 510. Control unit 510 may then use this information in determining the distance vehicle 104 has traveled, as well as speed, velocity, and acceleration. Second positioning device 520 may attach to a different wheel than first positioning device 515. For example, first positioning device 515 may attach to a left rear wheel and second positioning device 520 may attach to a right rear wheel. In this case, the current direction of movement of the antenna array may be determined, with respect to a start direction, by calculating the difference in traveled distance between first and second positioning devices 515 and 520.

In other embodiments, positioning devices 515 and 520 may comprise one or more GPS receivers, accelerometers, rotary position measurement devices, or others sensors and gauges known to those of ordinary skill in the art. These devices may be used to appropriately determine the current position, velocity, and/or direction of the antenna array. This information can be used in processing the data received from the antenna array as well as determining which antennas should be activated.

Control unit 510 may have one or more digital interfaces to digital devices 525 and/or analog interfaces to analog devices 530. For example, in one embodiment, analog device 530 is used to control tilt sensors.

Control unit 510 is communicably coupled to array control unit 535. In one embodiment, an interface 531 with a data and address bus, clock signal, status lines, and semaphores establish a connection between standard control unit 510 and array control unit 535. In some embodiments, this interface 531 allows for information needed or requested by components of array control unit 535 and control unit 510. Examples of such information includes, but is not limited to, parameter information, samples, stacks, sampling frequency, position information, radar data, and the like.

Array control unit 535 is communicably coupled to an antenna array 206. In one embodiment, array control unit 535 includes coaxial connectors for attachment of antennas. One output trigger line $TR_x$ and one input serial data line $DR_x$ can be connected to each receive antenna $R_1$-$R_{256}$. Similarly, one trigger line $TT_1$-$TT_{256}$ may be connected to transmit antennas $T_1$-$T_{256}$. While in one embodiment, array control unit 535 may support 16 antenna pairs enabling a maximum of 31 channels, other embodiments allow for different antenna pairs. In the embodiment depicted in FIG. 5, for example, 256 receivers 540 and 256 transmitters 550 are present.

Figure 6:
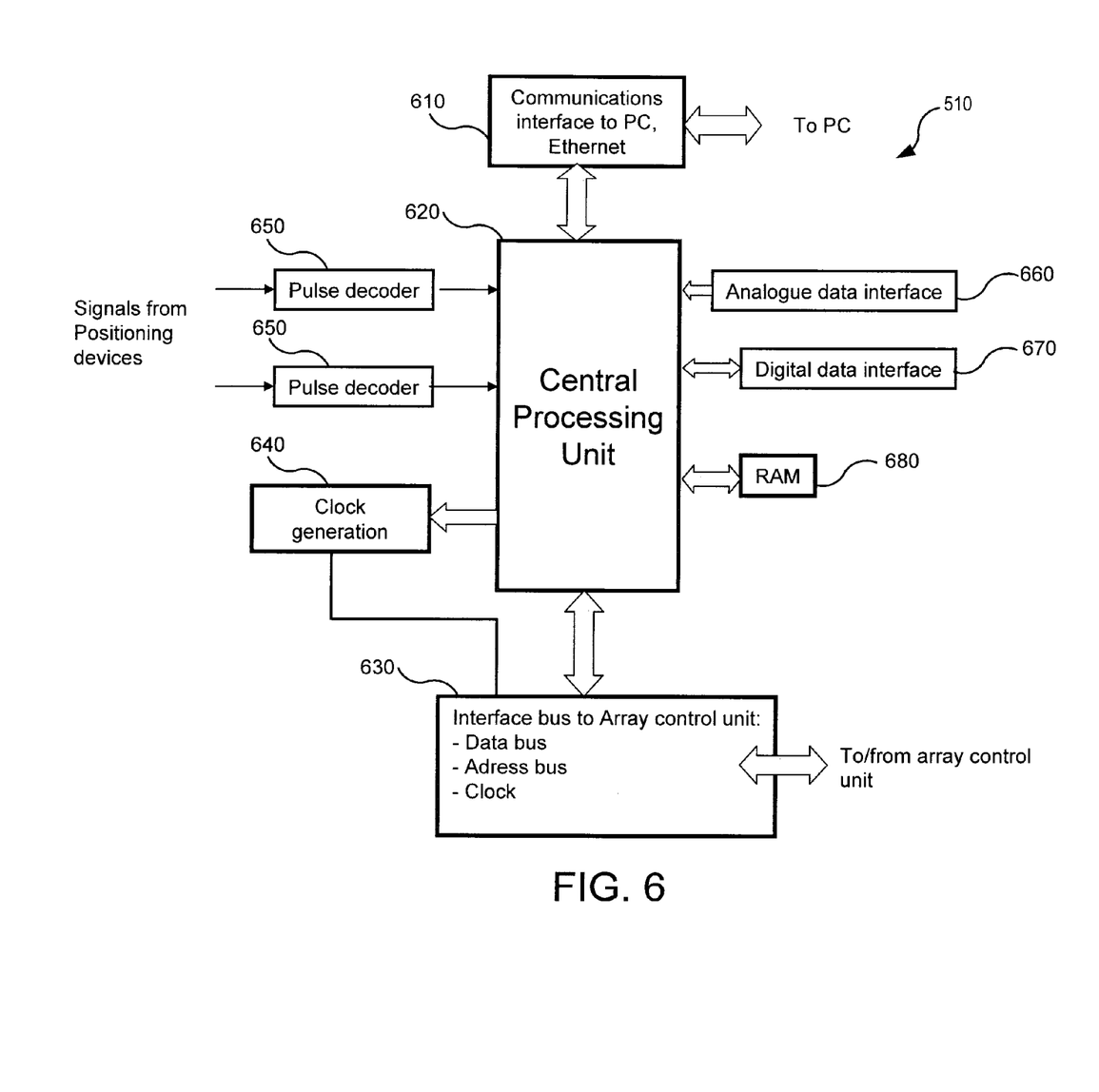
FIG. 6 is a block diagram of a control unit of a GPR system which can be used with the GPR system shown in FIG. 5.

FIG. 6 is a block diagram of control unit 510 of a GPR system which can be used with the GPR system of FIG. 5. The illustrated embodiment of control unit 510 includes a communications interface module 610, a central processing unit (CPU) 620, array control unit interface 630, a clock generation module 640, pulse decoders 650, analog data interface module 660, digital data interface modules 670, and a memory store 680.

According to one embodiment, communications interface module 610 allows CPU 620 to be communicably coupled to PC 505 (FIG. 5). For example, according to one embodiment, data received from an antenna array may be passed through CPU 620 to a more powerful processing device, such as an external computer, where additional processing and storage of the data may occur. In accordance with various embodiments, communications interface module 610 may include Ethernet cards, wireless network cards, parallel ports, serial ports, and others.

CPU 620 is able to receive signals from positioning devices such as 515 and 520 of FIG. 5 through pulse decoders 650, analog and digital data through analogue data interface 660 and digital data interface 670, and from array control unit 535 (FIG. 5). Some or all of the available information can be used to create a sequence representing a triggering sequence of antennas in the antenna array 106. In one embodiment, CPU 620 generates multiple-bit binary sequence data representative of a desired triggering sequence for the array of antennas.

In some embodiments, pulse decoders 650 may be used to decode pulse trains sent by the positioning devices. For example, if the positioning device was an quadrature encoder the transmission two output channels (A and B) to sense position would be provided. Using two code tracks with sectors positioned 90 degrees out of phase, the two output channels of the quadrature encoder indicate both position and direction of rotation. If A leads B, for example, the disk is rotating in a clockwise direction. If B leads A, then the disk is rotating in a counter-clockwise direction. However, pulse decoder modules 650 are able to use the information provided by the two channels to determine position data and estimate velocity.

CPU 620 generates a triggering sequence based on operational modes selected by the user through an external interface, such as a PC 505 or an interface board. The operational mode determines what is going to make a predefined sequence being run as well as what that sequence means in terms of which receivers are going to receive from which antenna. In one embodiment, a triggering sequence may be selected based on the operational mode and number of antennas of each type (receiving and transmitting) present. The selected triggering sequence may be one of a plurality of triggering sequences that have been previously generated and stored.

In other embodiments, the triggering sequence is generated based on one or more factors. For example, in one embodiment, an initial part of the sequence is run on the operational mode based on triggering. However, once position information and data from the antenna array are received, additional elements of the triggering sequence may be run based on time triggering.

CPU 620 is communicably coupled to a clock generation module 640. Clock generation module 640 can generate a signal which will be the basis for the repetition frequency of a linear sweep. The clock signal generated by module 640 and instructions from CPU 620 may be transferred to the array control unit 535 (FIG. 5) through array control unit interface 630. In one embodiment, array control unit interface 630 transfers information on a data bus, an address bus and a clock signal.

Analog data interface module 660 and digital data interface module 670 are available in various embodiments. These modules generally include signal conditioning circuitry. In one embodiment, the signal conditioning circuitry is a band pass filter and/or other driver circuitry Various pieces of information or data may be stored and accessed by CPU 620 in memory store 680. According to various embodiments memory store 680 can be any device, mechanism, or populated data structure used for storing information. As examples, memory store 680 may be one or more databases, one or more tables, one or more files, volatile memory, nonvolatile memory and dynamic memory.

Figure 7:
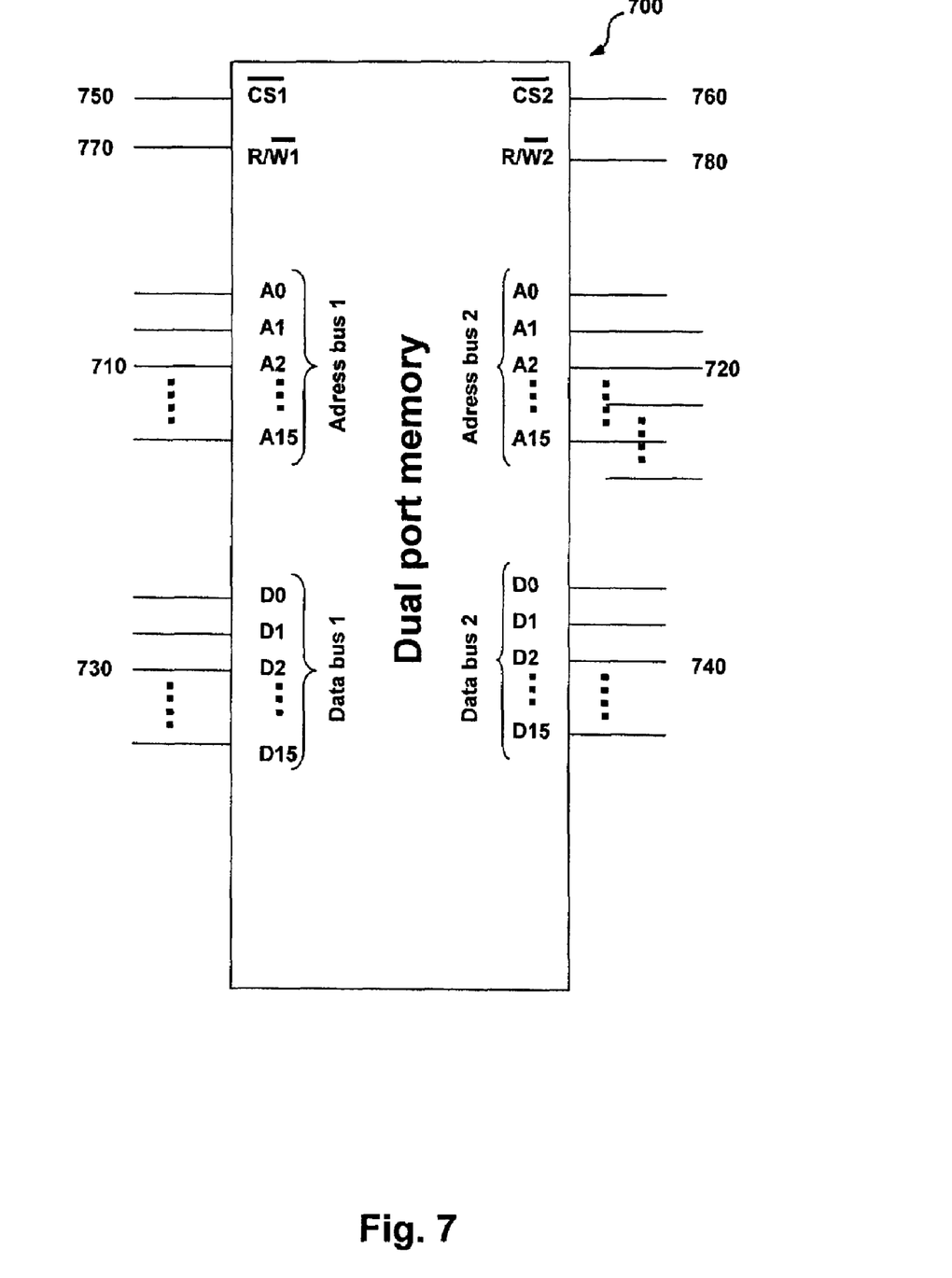
FIG. 7 illustrates an exemplary dual port memory device which may be used in one embodiment of a GPR system.

Array control unit 535 uses a memory or buffer to receive the triggering sequence from CPU 620. In one embodiment, the memory is a dual port memory device which allows multiple reads or writes to occur at the same time, or nearly the same time. FIG. 7 illustrates an exemplary dual port memory device 700 which may be used in one embodiment of a GPR system.

Dual port memory device 700 has multiple memory locations which may be indexed into by first address lines 710 or second address lines 720. The number of lines depend on the number of memory locations within the memory device. In the embodiment illustrated in FIG. 7, sixteen data lines are available to index into memory locations. Using first data lines 730 or second data lines 740, data may be retrieved or added to the memory location indicated by address lines 710 and 720.

In addition to address lines and data lines, dual port memory 700 shown in FIG. 7 has chip select lines 750 and 760 as well as read/write lines 770 and 780. Chip select lines 750 and 760 activate or deactivate each side of the dual port memory 700. Read/write lines 770 and 780 provide a signal indicating whether data is to be read or written from each side of the device.

Figure 8:
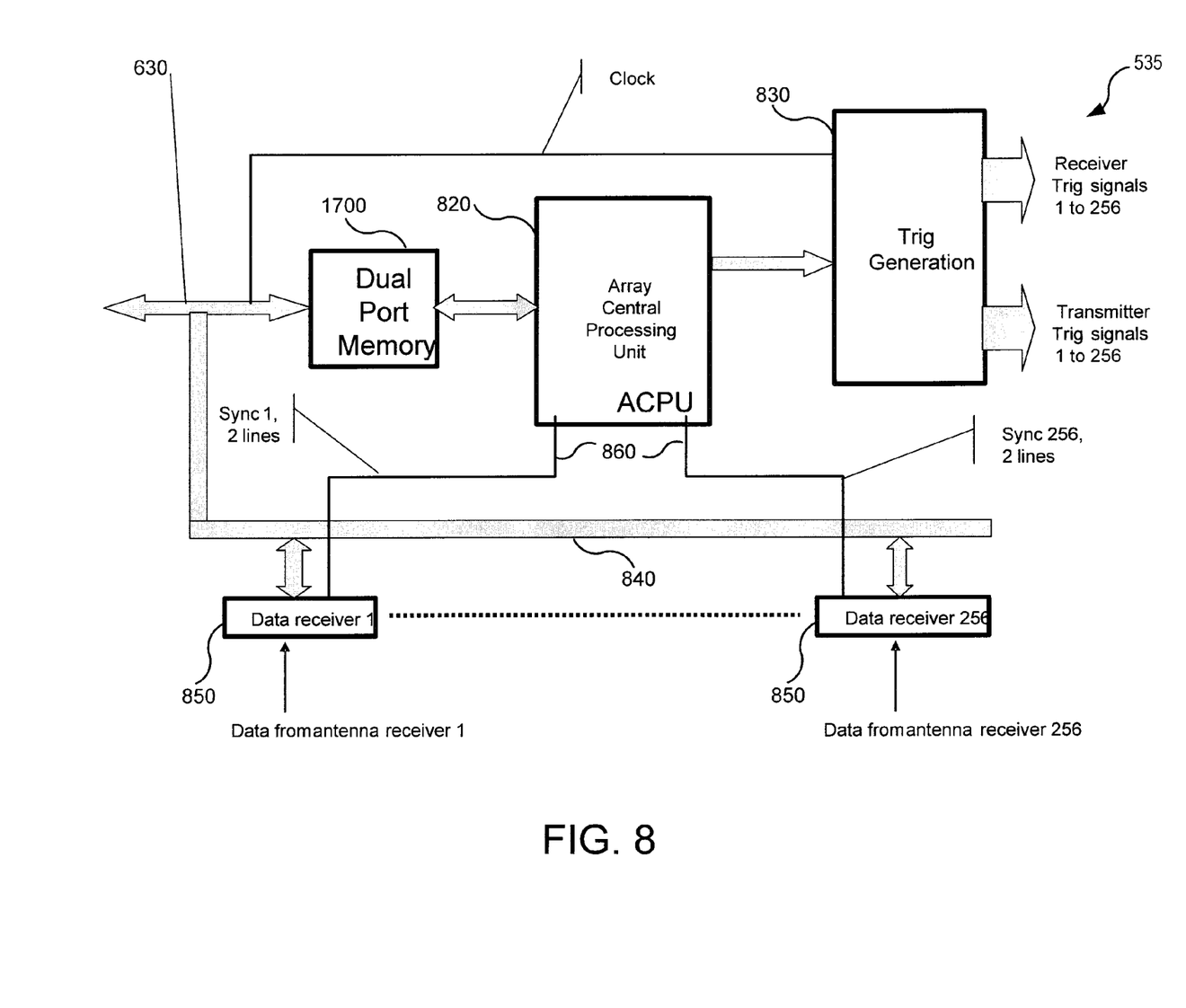
FIG. 8 illustrates an exemplary block diagram of an array control unit which can be used with the GPR system shown in FIG. 5.

FIG. 8 a detailed block diagram of an array control unit 535 which can be used with the GPR system shown in FIG. 5. The array control unit 535 shown in FIG. 8 includes a dual port memory 1700, an array central processing unit (ACPU) 820, and a trigger generation module 830.

Status and information signals are transferred from array control interface 630 to ports on ACPU 820. As illustrated in FIG. 8, data and address busses 840 of interface 630 are coupled to a first side of a high-speed dual port memory device 1700. The second side is coupled to the address and data bus of ACPU 820 in accordance with one embodiment.

ACPU 820 may include components which are implemented in hardware, software, or a combination thereof. In one embodiment, digital information may be transferred between control unit 510 and the ACPU 820 at very high speeds. For example, when a sequence of antennas is transmitted from the control unit's CPU 620, the data can be stored in dual port memory 1700. This information, as it is being stored, can be accessed independently through the second side of dual port memory 1700 by ACPU 820. Similarly, data may be stored in dual port memory 1700 by ACPU 820 through the second side. The data may then be accessed by the control unit 510 through the first side. All memory locations within dual port memory 1700 are able to be read from both sides, while only some memory locations are able to be written to through the first side and the rest of the memory locations are able to be written to from the second side. According to one embodiment, this may be accomplished through logic (not shown) located between control unit 510 and the first side of dual port memory 1700 and additional logic (not shown) positioned between ACPU 820 and the second side of dual port memory 1700. In another embodiment, ACPU 810 and the control unit 510 are only able to generate addresses for writing which are assigned to each device.

ACPU 820 uses information about the desired antenna triggering sequence and other data received from dual port memory 1700 to determine an input to trigger generation module 830. Each receive antenna has a dedicated data receiver 850 in one embodiment of the invention. Trigger generation module 830 creates a trigger sequence to activate receive antennas 540 and transmit antennas 550. Data is fed from the receive antennas to the data receivers through a serial, high speed data line (e.g., ≧4M bit/sec) in one embodiment. The data receiver converts the serial data to parallel format and can do some signal processing (e.g., averaging) prior to buffering the data in memory 1700. The central processing unit 620 can directly read this data through the interface bus 630 and buffer the data for transfer to PC 505.

Figure 9:
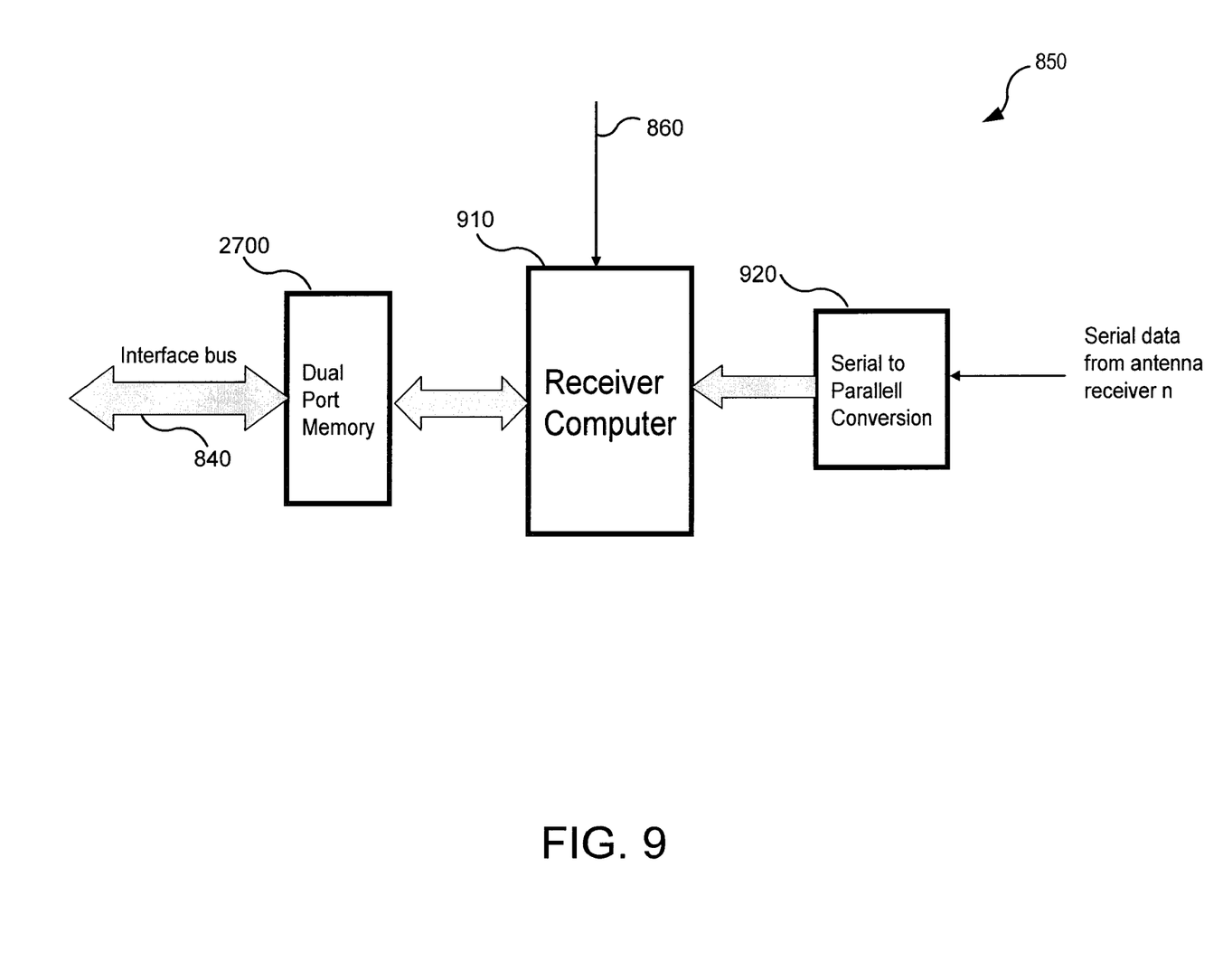
FIG. 9 is a block diagram of an exemplary data receiver module which can be used in the array control unit illustrated in FIG. 8.

The embodiment shown in FIG. 8 includes synchronization lines 860 which allow ACPU 820 to control when the data receivers 850 will receive data from receive antennas 540 in a synchronized fashion. FIG. 9 is a block diagram of an exemplary data receiver module 850 which can be used in array control unit 535 illustrated in FIG. 8. According to the embodiment shown in FIG. 9, data receiver 850 includes a receiver computer 910, a serial to parallel conversion module 920, and a dual port memory 2700.

Receiver computer 910, according to some embodiments, determines how to collect data based on data provided by the control unit 510. Using the synchronization signals from the ACPU 820, which are transmitted via synchronization lines 860, the timing for recording or collecting data is determined. For example, when the synchronization signal from the ACPU 820 activates, receiver computer 910 starts to collect data coming from the serial to parallel conversion module 920. This data may then be stored using the second side of dual port memory 2700.

In one embodiment, serial data from a receive antenna 540 is transmitted to serial to parallel conversion module 920. Serial to parallel conversion module 920 converts serial data to parallel data which is then transmitted to receiver computer 910. In one embodiment, serial to parallel conversion module 920 includes hardware, software, and/or a combination thereof to perform the data transformation. One advantage of having data receivers 850 associated with each receive antenna 540 is that it allows for asynchronous collection of data from the different receive antenna.

Figure 10:
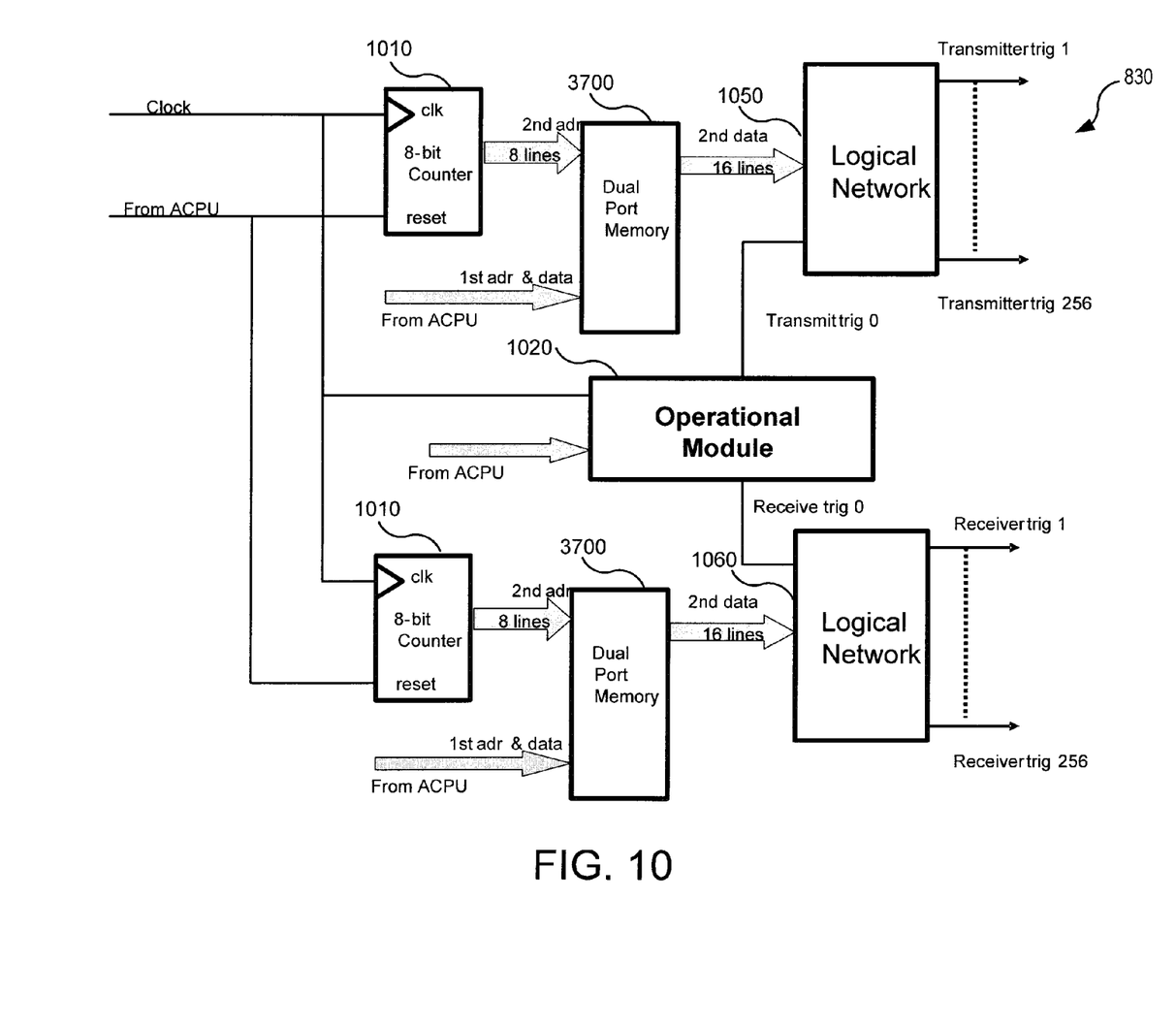
FIG. 10 is a block diagram of an exemplary trigger generation module which can be used in the array control unit illustrated in FIG. 8.

FIG. 10 is a block diagram of an exemplary trigger generation module 830 which can be used in array control unit 535 of FIG. 8. Trigger generation module 830 provides a solution for directing the trigger signals to any combination of receivers 540 and transmitters 550 without direct control from a computer. This is advantageous because in many of the embodiments described, the directing of trigger signals by hardware is faster than many computer applications.

According to the embodiment shown in FIG. 10, a clock signal from interface bus 630 is fed to two 8-bit counters 1010 and to operational module 1020. Counters 1010 provide a counting sequence which can be enabled, stopped and reset by a signal from the ACPU 820. The counting sequence generated by counters 1010 may be used to address 256 by 16 bit wide dual port memories 3700. According to one embodiment, a specific sequence has be stored in each of these dual port memories 3700 prior to activating the GPR. Consequently, clocks 1010 address increasing addresses in the dual port memory and output the sequence stored in the dual port memory 3700 to logical networks, such as logical networks 1050 and 1060.

Operational module 1020, at least according to various embodiments, uses the clock signal for generating time base, receive and transmit triggers as well as implementing a sweep control. In one embodiment, signals from the ACPU 820 may also control which operational mode is selected, speed, frequency, and the like. According to various embodiments operational module 1020 is able to work with a clock frequency of 100 kHz to 1 MHz and higher.

In one embodiment, operation module 1020 returns transmit trigger 0 and receive trigger 0 as digital square waves with a frequency around 1 MHz or higher. According to one embodiment, transmit trigger 0 and receive trigger 0 are synchronized enough with each other, in each cycle, for being used as trigger signals in an array system.

In the embodiment shown in FIG. 10, transmit trigger 0 and receive trigger 0 are fed to digital logical networks 1050 and 1060, respectively. These digital logical networks are controlled by the output of the dual port memories 3700. In this embodiment, since 16 data lines are present, it is possible to direct, through the use of combinational logic, each trigger signal to 65,535 different output lines. In some embodiments, however, only 256 output lines are used.

Figure 11:
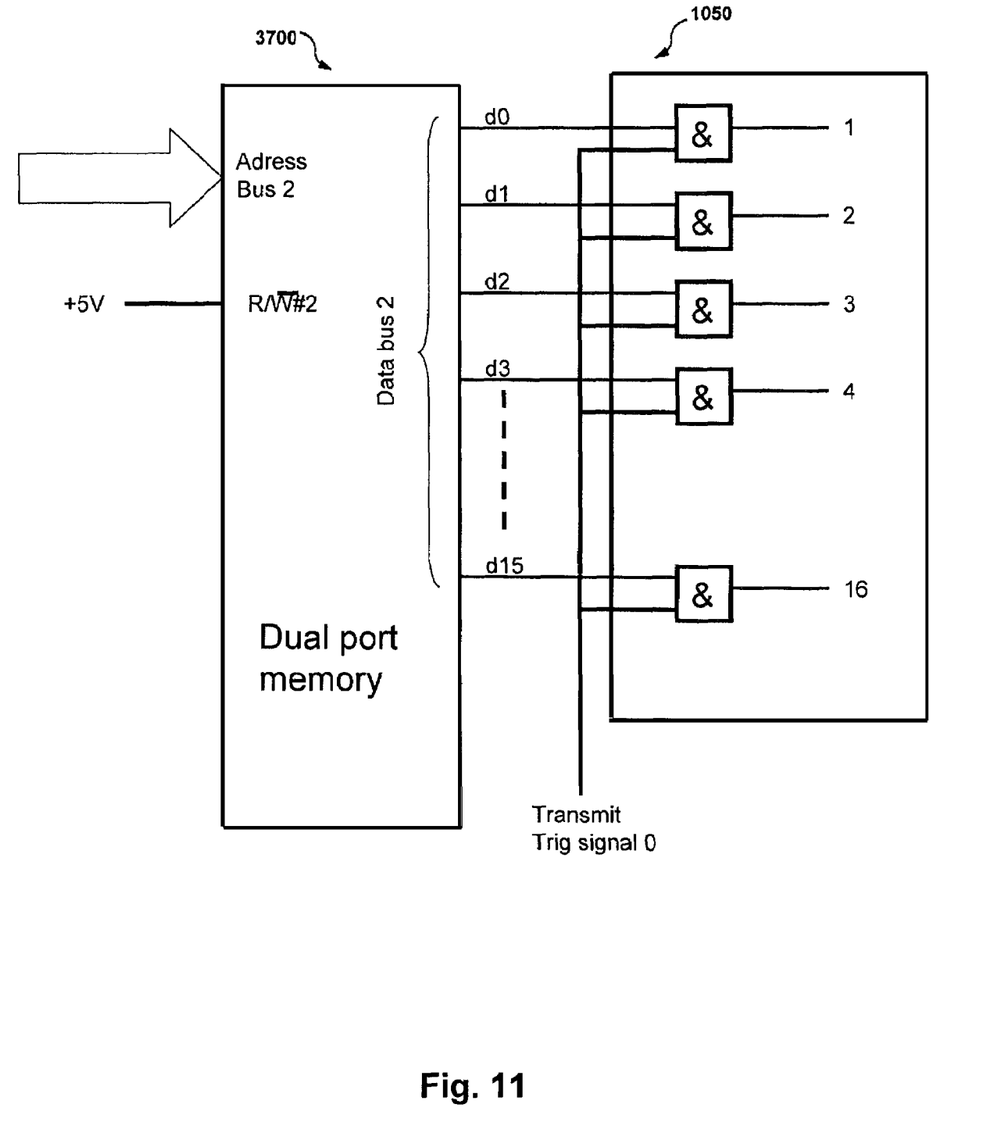
FIG. 11 illustrates an exemplary logical network which may be used in the trigger generation module illustrated in FIG. 10.

FIG. 11 illustrates an exemplary logical network 1050 (or 1060) which may be used in the exemplary trigger generation module illustrated in FIG. 10. To illustrate how embodiments of the present invention may operate, consider the following binary data written in the first address locations in the memory through use of the first port.

TABLE 1

Binary Data Stored in Memory Locations

| Address | Binary data (16-bit, bit 15- bit 0) |
|---|---|
| 0 | 0000 0000 0000 0001 |
| 1 | 0000 0000 0000 0010 |
| 2 | 0000 0000 0000 0100 |
| 3 | 0000 0000 0000 1000 |

The counter circuitry previous described starts addressing the first location in the memory and forces the pin carrying d0 (data bit 0) to go high. This enables the common trigger signal to pass through the and-gate to trig 1 output. During the next cycle the d1 goes high while d0 goes back to low level, this opens the trigger to pass trough to trig output 2. And so on and so on. The numerical sequence store in the memory 3700 can represent any single antenna or combination of antennas which are desired to be activated Consequently, by writing sequences of numbers into the memory 3700 and letting the clock (e.g., 1010) control the counter, a very fast switching of the trigger to different trigger outputs may be achieved. This would be difficult, if not impossible, to accomplish with software since typically rates of 1 MHz and higher may be requested. With these types of high frequencies, less than 1 microsecond would be required for the computer to react and put out the proper value. It is more efficient to generate the trigger signals using the dual port memory 3700 and logical network 1050.

The logical network described in FIG. 11 is one of the simplest possible. It should be clear that from 16 outputs, redirection to 65535 different output locations is possible. This is, however, typically not needed and the more complex network the more, small, in-circuit delays are added. In some embodiments, all paths in the network can have about the same depths in terms of how many logical circuits are passed for the trig signal.

Also in accordance with one embodiment of the present invention, any number may be placed in memory, and thus trigger all the antenna at the same time, or none and anything in between. Consequently, this type of network structure connected to both dual port memories 3700 (on receiver and transmitter trig 0) can shoot from any transmitter 550 to any receiver 540. Any combination of shooting between transmitters 550 and receivers 540 is possible as long as the dual port memory 700 is correctly programmed and handle start and stop.

For convenience, embodiments of the present invention have been described with reference to a ground penetrating radar systems. In particular, various embodiments include a trigger generation system comprising a memory with a plurality of memory locations which are capable of being actively accessed by two devices. However, embodiments of the present invention are equally applicable to various other systems which generate trigger signals. Examples of applicable systems with which embodiments of the present invention may be applicable include, but are not limited to, various security systems, sensor networks, and other types of radar systems and networks.

Moreover, various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A system for triggering an array of antennas in a radar system, including:
    memory to store and output multiple-bit binary sequence data representative of a desired triggering sequence for the array of antennas;
    a logical network to receive a timing input signal and the sequence data from the memory, to produce a plurality of trigger signals as a logical function of the timing input signal and the sequence data; and
    wherein the memory includes dual port memory comprising a first data port for receiving the multiple-bit sequence data and a second data port for outputting the multiple-bit sequence data to the logical network.

2. The system of claim 1 wherein:
    the memory stores and outputs transmit antenna sequence data representative of a desired triggering sequence for an array of transmit antennas; and
    the logical network receives a transmit timing input signal and produces a plurality of transmit antenna trigger signals as a logical function of the transmit timing input signals and the transmit antenna sequence data.

3. The system of claim 1 wherein:
    the memory stores and outputs receive antenna sequence data representative of a desired triggering sequence for an array of receive antennas; and
    the logical network receives a receive timing input signal and produces a plurality of receive antenna trigger signals as a logical function of the receive timing input signals and the receive antenna sequence data.

4. The system of claim 1 wherein the dual port memory further includes:
    a first address port for receiving addresses for storing the multiple-bit sequence data; and
    a second address port for receiving a counter signal for causing the multiple-bit sequence data to be outputted at the second data port.

5. The system of claim 4 and further including a counter for providing the counter signal to the second address port of the dual port memory.

6. The system of claim 4 and further including an array central processing unit for providing the sequence data to the first data port of the dual port memory.

7. The system of claim 6, further comprising at least one data receiver coupled to the array central processing unit by a synchronization line, wherein the data receiver includes:
    a conversion module to receive serial data from an antenna receiver and output the received serial data as parallel data;
    a data receiver dual port memory having a first side and a second side attached to the master bus, wherein the first side and the second side of the data receiver dual port memory independently provide access to data locations within the data receiver dual port memory; and
    a receiver computer communicably coupled to the conversion module, wherein the receiver computer is capable of receiving the parallel data output from the conversion module and transfer requested data to the first side of the data receiver dual port memory for storage.

8. The ground penetrating radar antenna array control unit of claim 7, wherein the receiver computer determines how to collect data based a subset of received measurement parameters.

9. The system of claim 1 wherein the multiple-bit sequence data was generated by a processing unit based on position information received from one or more positioning devices and current operational modes.

10. The system of claim 1 wherein the logical network includes AND gates for producing the trigger signals as a logical AND function of the timing input signal and the bits of the sequence data.

11. A trigger generation system for a ground penetrating radar having an array of transmit and receive antennas, including:
    a transmit dual port memory to store and output multiple-bit transmit antenna sequence data, including:
        a first data port for receiving the transmit antenna sequence data;
        a first address port for receiving transmit storage addresses for the transmit antenna sequence data;
        a second data port for outputting the transmit antenna sequence data; and
        a second address port for receiving a counter signal and causing the transmit antenna sequence data to be outputted at the first data port;
    a transmit counter coupled to the second address port of the transmit dual port memory, for receiving a clock signal and producing the counter signal;
    a transmit logical network coupled to the second data port of the transmit dual port memory, for receiving a transmit timing input signal and producing a plurality of transmit trigger signals as a logical function of the transmit timing input signal and the transmit antenna sequence data;
    a receive dual port memory to store and output multiple-bit receive antenna sequence data, including:
        a first data port for receiving the receive antenna sequence data;
        a first address port for receiving receive storage addresses for the receive antenna sequence data;
        a second data port for outputting the receive antenna sequence data; and
        a second address port for receiving a counter signal and causing the receive antenna sequence data to be outputted at the first data port;
    a receive counter coupled to the second address port of the receive dual port memory, for receiving a clock signal and producing the counter signal;
    a receive logical network coupled to the second data port of the receive dual port memory, for receiving a receive timing input signal and producing a plurality of receive trigger signals as a logical function of the receive timing input signal and the receive antenna sequence data.

12. The trigger generation system of claim 11 and further including an array processing unit coupled to the transmit dual port memory and the receive dual port memory, for providing the transmit storage addresses and transmit antenna sequence data to the transmit dual port memory, and for providing the receive storage addresses and receive antenna sequence data to the receive dual port memory.

13. The trigger generation system of claim 12 wherein:
the transmit logical network includes combinational logic to generate trigger sequences for transmit antennas based on sequence data received from the transmit dual port memory; and
the receive logical network includes combinational logic to generate trigger sequences for receive antennas based on sequence data received from the receive dual port memory.

14. A method for generating a plurality of trigger signals, the method comprising:
indexing into a memory location within a dual port memory having a first side and a second side allowing independent access to memory locations in the dual port memory;
receiving and storing address and data values through the first side of the dual port memory, wherein the address and data values include a numerical sequence indicating which transmit and receive antennas in an antenna array to activate; and
retrieving the stored address and data values through the second side of the dual port memory.

15. The method of claim 14, further comprising:
receiving positioning information about the antennas in the antenna array; and
determining the numerical sequence indicating which transmit and receive antennas to activate based in part on the received positioning information.

16. The method of claim 14, wherein the receiving and storing address and data values through the first side of the dual port memory occurs substantially at the same time the retrieving the stored address and data values through second side of the dual port memory is occurring.

17. The method of claim 14, further comprising:
communicating the retrieved address and data values to a logical network; and
generating a trigger signal which indicate timing and selection of a subset of antennas to be activated in an antenna array based on a selected operational mode and the communicated address and data values.

18. The method of claim 17, wherein the operation mode chosen from the group consisting of a time base generator mode, a sweep control mode, a transmitter trigger generation mode, and a receiver trigger control mode.

19. The method of claim 17, wherein the logical network includes combinational logic to generate the trigger signals.

20. The method of claim 19, wherein a path within the combination logic from the input each generated trigger output have the same depth.

* * * * *